(12) United States Patent
Levy et al.

(10) Patent No.: US 12,470,536 B2
(45) Date of Patent: Nov. 11, 2025

(54) INTER-DOMAIN ACCESS USING IDENTITY PROVIDER

(71) Applicant: Dell Products L.P., Round Rock, TX (US)

(72) Inventors: Shoham Levy, Ra'anana (IL); Amos Zamir, Beer Sheva (IL); Stav Sapir, Beer Sheba (IL)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 18/130,620

(22) Filed: Apr. 4, 2023

(65) Prior Publication Data
US 2024/0340275 A1    Oct. 10, 2024

(51) Int. Cl.
H04L 9/40    (2022.01)

(52) U.S. Cl.
CPC ........ H04L 63/0807 (2013.01); H04L 63/102 (2013.01)

(58) Field of Classification Search
CPC .................... H04L 63/0807; H04L 63/102
See application file for complete search history.

(56) References Cited

U.S. PATENT DOCUMENTS

| | | | | |
|---|---|---|---|---|
| 11,563,729 B2 * | 1/2023 | Hirosawa | ............. | H04W 12/06 |
| 2012/0131661 A1 * | 5/2012 | Novak | ................ | H04L 63/0884 726/9 |
| 2014/0282940 A1 * | 9/2014 | Williams | ............ | H04L 63/0807 726/6 |
| 2016/0248757 A1 * | 8/2016 | Williams | ............ | H04L 63/1466 |
| 2018/0199195 A1 * | 7/2018 | Metral | ................ | H04L 63/0861 |
| 2019/0014117 A1 * | 1/2019 | Li | ........................ | H04W 12/06 |
| 2021/0258153 A1 * | 8/2021 | Yin | ........................ | H04L 63/08 |
| 2023/0164139 A1 * | 5/2023 | Chien | ................ | H04L 63/0823 455/411 |

(Continued)

OTHER PUBLICATIONS

Divilly, Colm; "Using OAuth, OIDC in Cross Domain Browser Apps"; https://blog.cdivilly.com/2020/06/10/oauth-browser-apps; Jun. 10, 2020.

(Continued)

Primary Examiner — Yonas A Bayou
(74) Attorney, Agent, or Firm — Ryan, Mason & Lewis, LLP

(57) ABSTRACT

Techniques are provided for inter-domain access using an identity provider. One method comprises receiving, by a first domain, a request from a device of a second domain, different than the first domain, that requires the first domain to perform an operation on the second domain; providing, by the first domain, in response to the received request, (i) an access identifier, (ii) a destination identifier of the first domain and (iii) a redirection instruction, wherein the redirection instruction redirects the device to an identity provider associated with the second domain to validate the device, and wherein the second domain, in response to the device being validated, generates an access token; receiving, by the first domain, from the second domain, using the destination identifier of the first domain, the access token and the access identifier; and performing, by the first domain, the operation on the second domain using the access token.

20 Claims, 9 Drawing Sheets

(56) References Cited

U.S. PATENT DOCUMENTS

2023/0308277 A1* 9/2023 Van Cleve .............. H04L 63/10

OTHER PUBLICATIONS

"How is SAML Solving the Cross Domain Single Sign-on Problem?" https://security.stackexchange.com/questions/38802/how-is-saml-solving-the-cross-domain-single-sign-on-problem; downloaded on Apr. 3, 2023.
U.S. Appl. No. 17/730,771 entitled, "Performance of User Operations by a First System on a Second System Using User Impersonation" filed Apr. 27, 2022.

* cited by examiner

| USER | SECOND HOST DEVICE (DOMAIN 2) | ACCESS TOKEN |
|---|---|---|
| ALICE | SYSTEM1.ACME.COM | KEY1 |
| ALICE | DEVICE4.JOKESOFTHEDAY.COM | KEY2 |
| BOB | SYSTEM3.ACME.COM | KEY3 |
| CAROL | SYSTEM2.ACME.COM | KEY4 |
| DAVE | DEVICE4.JOKESOFTHEDAY.COM | KEY5 |

0. USER LOGS IN TO A SITE CONNECTED TO AN IDP AND OBTAINS A SESSION COOKIE ON USER DEVICE

1. USER INITIATES COMMAND ON FIRST SITE THAT REQUIRES FIRST SITE BACKEND TO PERFORM OPERATIONS ON SECOND SITE BACKEND USING AN ACCESS TOKEN TO ACCESS SECOND SITE BACKEND

2. FIRST SITE BACKEND GENERATES A BACKED ACCESS IDENTIFIER (BAI) FOR TRANSACTION AND SENDS BAI TO THE FIRST SITE FRONTEND, WHERE BAI IS ASSOCIATED WITH THE USER AND THE SECOND SITE

3. FIRST SITE FRONT END SPAWNS A NEW BROWSER SESSION ON LOGIN PAGE OF THE SECOND SITE, PASSING THE BAI AND A FIRST SITE DESTINATION IDENTIFIER AS URL PARAMETERS

4. BROWSER OF USER DEVICE OPENS LOGIN PAGE OF THE SECOND SITE, WITH THE BAI AS PART OF THE URL, INITIATING AN AUTHORIZATION CODE LOGIN SEQUENCE WHERE THE ACCESS TOKEN IS PROVIDED TO THE FIRST SITE BACKEND, AS FOLLOWS:

A.  REDIRECT SECOND SITE FRONTEND TO THE IDP;

B.  IDP RECOGNIZES EXISTING USER SESSION COOKIE OF USER DEVICE, AUTHENTICATES THE USER DEVICE, AND REDIRECTS BACK TO THE SECOND SITE FRONTEND WITH THE AUTHORIZATION CODE AS PART OF THE URL;

C.  SECOND SITE FRONTEND RELOADS WITH THE AUTHORIZATION CODE AND SENDS THE AUTHORIZATION CODE TO THE SECOND SITE BACKEND;

D.  SECOND SITE BACKEND SENDS THE AUTHORIZATION CODE TO THE IDP AND OBTAINS AN IDP ASSERTION FOR THE USER DEVICE;

E.  SECOND SITE BACKEND, NOW THAT THE USER IS AUTHENTICATED, ISSUES AN ACCESS TOKEN TO SECOND SITE BACKEND; AND

F.  SECOND SITE ACCESS TOKEN REMAINS IN THE SECOND SITE BACKEND AND THE SECOND SITE BROWSER SESSION COOKIE IS UPDATED TO A LOGGED IN STATUS

5. THE SECOND SITE BACKEND OPENS A SECURE CONNECTION TO THE FIRST SITE BACKEND, BASED ON THE FIRST SITE DESTINATION IDENTIFIER, USING A DESIGNATED TRUST MECHANISM, AND CALLS AN API ENDPOINT, ON THE FIRST SITE BACKEND, THAT IS USED TO PROVIDE THE ACCESS TOKEN AND THE BAI, SO THAT THE FIRST SITE BACKEN CAN ASSOCIATE THEM WITH THE USER AND SESSION

6. THE FIRST SITE BACKEND RECEIVES THE ACCESS TOKEN AND THE BAI AND UPON (A) MATCHING THE BAI WITH THE USER AND (B) VERIFYING THAT THE BAI CAME FROM THE SECOND SITE BACKEND, CACHES THE ACCESS TOKEN

7. FIRST SITE BACKEND PERFORMS ONE OR MORE OPERATIONS ON SECOND SITE BACKEND USING THE ACCESS TOKEN

FIG. 5B

INTER-DOMAIN ACCESS USING IDENTITY PROVIDER

FIELD

The field relates generally to information processing systems, and more particularly to accessing resources associated with such information processing systems.

BACKGROUND

Single sign-on (SSO) is an authentication mechanism that allows users to access resources provided by different systems, without authenticating multiple times. Existing SSO techniques assume that the different systems use the same identity provider (IDP) to authenticate a given user.

SUMMARY

In one embodiment, a method comprises receiving, by at least one processing device associated with a first domain, a request from a first device associated with a second domain that requires the at least one processing device associated with the first domain to perform at least one operation on at least one processing device associated with the second domain, wherein the second domain is a different domain than the first domain; providing, by the at least one processing device associated with the first domain, in response to the received request, (i) an access identifier, (ii) a destination identifier of the at least one processing device associated with the first domain and (iii) a redirection instruction, wherein the redirection instruction redirects the first device to an IDP associated with the second domain to validate the first device, and wherein the at least one processing device associated with the second domain, in response to the first device being validated, generates one or more access tokens; receiving, by the at least one processing device associated with the first domain, from the at least one processing device associated with the second domain, using the destination identifier of the at least one processing device associated with the first domain, at least one of the one or more access tokens and the access identifier; and performing, by the at least one processing device associated with the first domain, one or more of the at least one operation on the at least one processing device associated with the second domain using at least one of the one or more access tokens.

In some embodiments, the access identifier is linked to the first device and the at least one processing device associated with the second domain. The access identifier, the destination identifier of the at least one processing device associated with the first domain and/or the redirection instruction may be provided to the first device as uniform resource locator parameters.

In one or more embodiments, the first device has a session cookie issued by the IDP associated with the at least one processing device associated with the second domain. The IDP may validate the first device by one or more of validating the session cookie and providing a session cookie responsive to the IDP authenticating the first device.

In at least one embodiment, the access identifier identifies a scope of the at least one operation to be performed by the at least one processing device associated with the first domain on the at least one processing device associated with the second domain. In some embodiments, the at least one processing device associated with the first domain comprises a backend of the first domain, wherein the at least one processing device associated with the second domain comprises a backend of the second domain and wherein the backend of the first domain performs the at least one operation on the backend of the second domain.

Other illustrative embodiments include, without limitation, apparatus, systems, methods and computer program products comprising processor-readable storage media.

BRIEF DESCRIPTION OF THE DRAWINGS

FIG. 4 is a sample table illustrating a storage of access tokens by one or more of the host devices of FIG. 1 in accordance with an illustrative embodiment;

FIGS. 5A and 5B, collectively, are a process diagram illustrating an exemplary implementation of a process for inter-domain access using an IDP in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for inter-domain access using an IDP.

As noted above, existing SSO techniques assume that the different systems being accessed use the same IDP to authenticate a given user. One or more aspects of the disclosure recognize that SSO techniques do not address problems associated with, for example, backend access between different domains without explicitly involving a common IDP in the internal authorization flows (e.g., because authorization information must reside in the common IDP to enable backend authorization for inter-domain access). For example, such backend access may be required when a first device associated with one domain (e.g., associated with a particular uniform resource locator (URL)) needs to perform one or more operations on a second device that is associated with a different domain (e.g., the first device may be associated with the domain of a device manufacturer that hosts a Software as a service (SaaS), and the second device may be associated with a customer and may be located in the premises of the customer). The customer would like to use the customer's own IDP, to allow users to login to the SaaS provided by the device manufacturer using the user identities of the customer. The customer, however, would typically not want the device manufacturer to modify user definitions on the customer's IDP.

In one or more embodiments, techniques are provided for such inter-domain access using an IDP. In some embodiments, a first device, in a first domain, can initiate a new browser session on the second device, in the second domain, that will generate a user access token provided to a backend associated with the second device, and securely transfer the user access token to the backend associated with the first device, where the user access token can be used to call application programming interfaces (APIs) provided by the second device on behalf of the user. In this manner, the first device is provided with an offline access token to the second device, without the user providing his or her credentials to the first device, and without involving a common IDP in the authorization flow of either domain.

Figure 1:
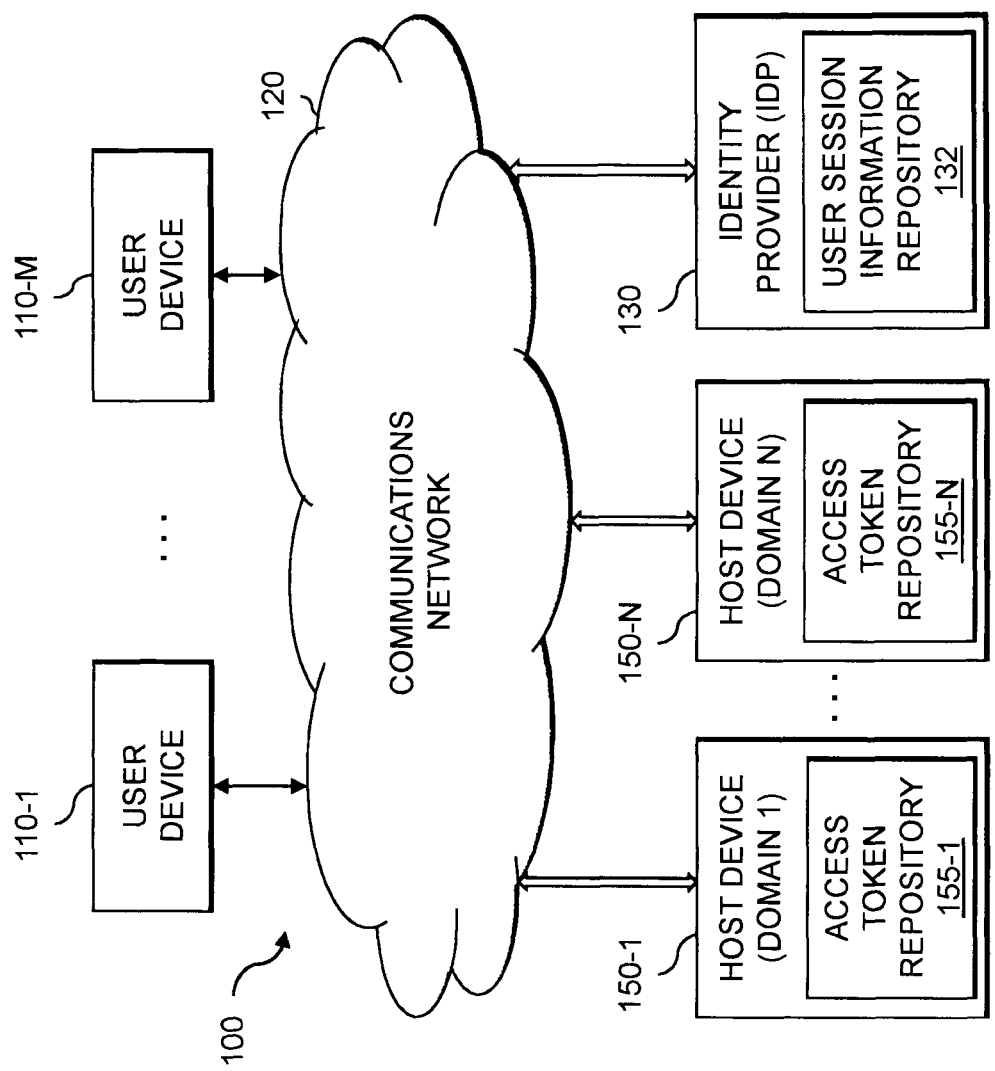
FIG. 1 illustrates an information processing system configured for inter-domain access using an IDP in accordance with an illustrative embodiment.

FIG. 1 shows an information processing system 100 configured in accordance with an illustrative embodiment. The information processing system 100 comprises a plurality of user devices 110-1 through 110-M, collectively referred to herein as user devices 110. The information processing system 100 further comprises one or more IDPs 130 and one or more host devices 150-1 through 150-N (e.g., servers) associated with respective domains 1 through N, collectively referred to herein as host devices 150, discussed below.

The user devices 110 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 110 may comprise a network client that includes networking capabilities such as ethernet, Wi-Fi, etc.

One or more of the user devices 110, the IDPs 130 and/or the host devices 150 may be coupled to a communications network 120, where the network 120 in this embodiment is assumed to represent a sub-network or other related portion of a larger computer network. The network 120 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 120 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 110, the IDPs 130 and/or the host devices 150 illustratively comprise processing devices of one or more processing platforms. For example, the host devices 150 may comprise one or more processing devices each having a processor and a memory, possibly implementing virtual machines and/or containers, although numerous other configurations are possible. The processor illustratively comprises a microprocessor, a microcontroller, a central processing unit (CPU), a graphics processing unit (GPU), a tensor processing unit (TPU), an application-specific integrated circuit (ASIC), a field-programmable gate array (FPGA) or other type of processing circuitry, as well as portions or combinations of such circuitry elements.

One or more of the user devices 110, the IDPs 130 and/or the host devices 150 can additionally or alternatively be part of edge infrastructure and/or cloud infrastructure such as an Amazon Web Services (AWS) system. Other examples of cloud-based systems that can be used to provide at least portions of the user devices 110, the IDPs 130 and/or the host devices 150 include Google Cloud Platform (GCP) and Microsoft Azure.

As shown in FIG. 1, the exemplary host devices 150 comprise respective access token repositories 155-1 through 155-N, each storing access tokens, associated with the corresponding domain, that are used in connection with the disclosed techniques for inter-domain access using an IDP. One or more of the access token repositories 155 associated with the host devices 150 may be stored in a remote database accessible by the respective host devices 150. The host devices 150 may further include one or more additional modules and other components typically found in conventional implementations of such devices, although such additional modules and other components are omitted from the figure for clarity and simplicity of illustration.

In one or more embodiments, the exemplary host devices 150 may perform one or more authentication and/or authorization evaluations tasks, for example, in accordance with OpenID Connect (OIDC), OAUTH2 (Open Authorization 2.0) and/or Security Assertion Markup Language (SAML) access control techniques, as modified herein to provide the features and functions of the disclosed inter-domain access techniques.

As noted above, the exemplary host devices 150 may require backend access, for example, between different domains. For example, such backend access may be required when a user initiates a command on at least one host device 150 associated with a first domain that requires a backend of the at least one first host device 150 to perform one or more operations on at least one host device 150 associated with a second domain, using an access token to access the at least one host device 150 associated with the second domain (e.g., the first host device 150 may be associated with the domain of a device manufacturer that hosts a Software as a service (SaaS), and the second host device 150 may be associated with a customer and located in the premises of the customer).

In the FIG. 1 embodiment, the host devices 150 are assumed to be implemented using at least one processing platform, with each such processing platform comprising one or more processing devices, and each such processing device comprising a processor coupled to a memory. Such processing devices can illustratively include particular arrangements of compute, storage and network resources.

In the example of FIG. 1, the IDP 130 comprises a user session information repository 132 for storing information related to user sessions. The IDP 130 may further include one or more additional modules and other components typically found in conventional implementations of such devices, although such additional modules and other components are omitted from the figure for clarity and simplicity of illustration.

In the FIG. 1 embodiment, the IDP 130 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the IDP 130 to reside in different data centers. Numerous other distributed implementations of the components of the system 100 are possible.

Also associated with one or more of the user devices 110, the IDP 130 and/or the host devices 150 can be one or more input/output devices (not shown), which illustratively comprise keyboards, displays or other types of input/output devices in any combination. Such input/output devices can be used, for example, to support one or more user interfaces to a user device 110, as well as to support communication between the IDP 130 and/or the host devices 150 or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for inter-domain access using an IDP is presented by way of illustrative example only, and in other embodiments additional or alternative elements may be used. Thus, another embodiment includes additional or alternative systems, devices and other network entities, as well as different arrangements of modules and other components.

Figure 2:
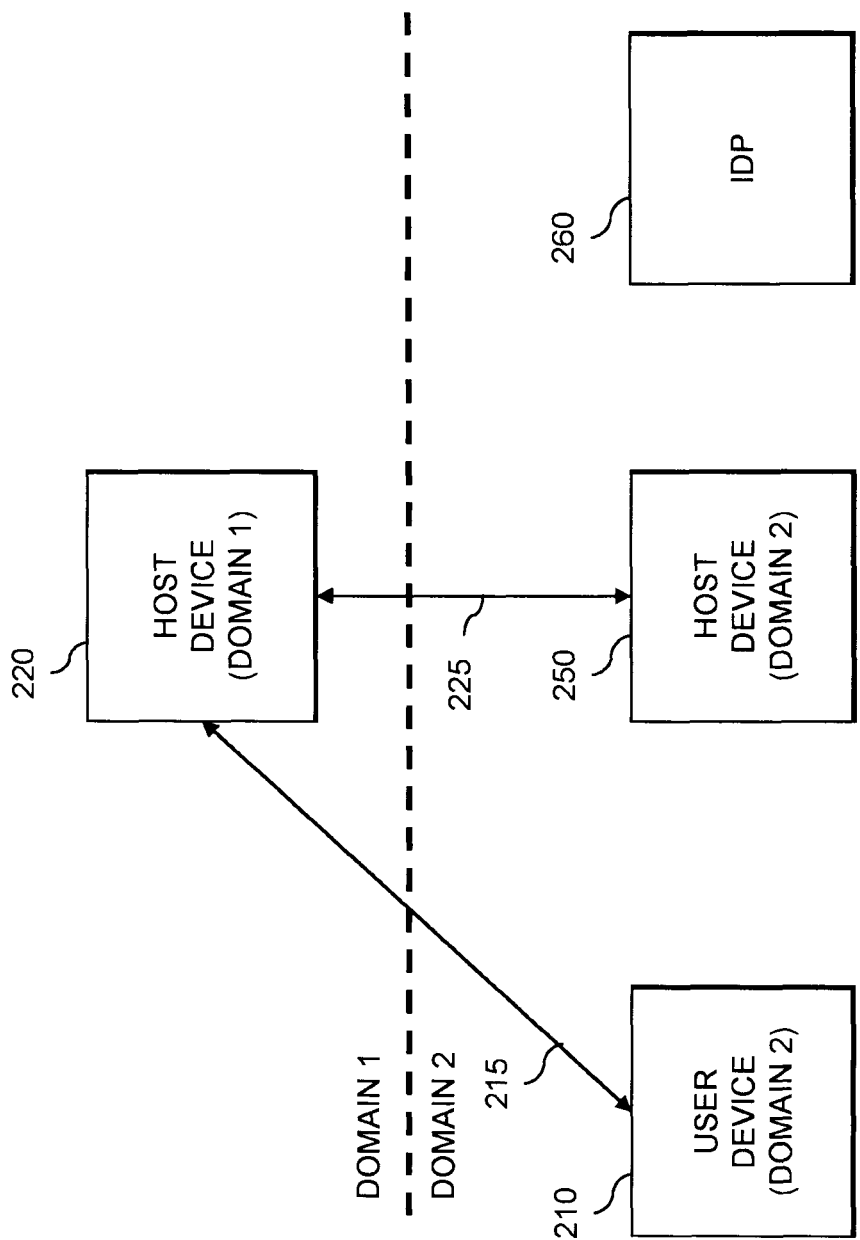
FIG. 2 illustrates inter-domain access in accordance with an illustrative embodiment.

FIG. 2 illustrates inter-domain access in accordance with an illustrative embodiment. In the example of FIG. 2, a user device 210 associated with a second domain (domain 2) may initiate a command, using a connection 215, on a host device 220 associated with a first domain (domain 1) that requires the host device 220 to perform one or more operations, using a connection 225, on a host device 250 associated with the second domain using an access token to access the host device 250.

The user device 210 is redirected by the host device 220 associated with the first domain to an IDP 260 associated with the second domain to validate the user device 210, as discussed further below in conjunction with FIGS. 5A and 5B, for example. The host device 250 associated with the second domain generates one or more access tokens, in response to the user device 210 being validated, that may be used by the host device 220 associated with the first domain to perform the one or more operations on the host device 250 associated with the second domain.

Figure 3:
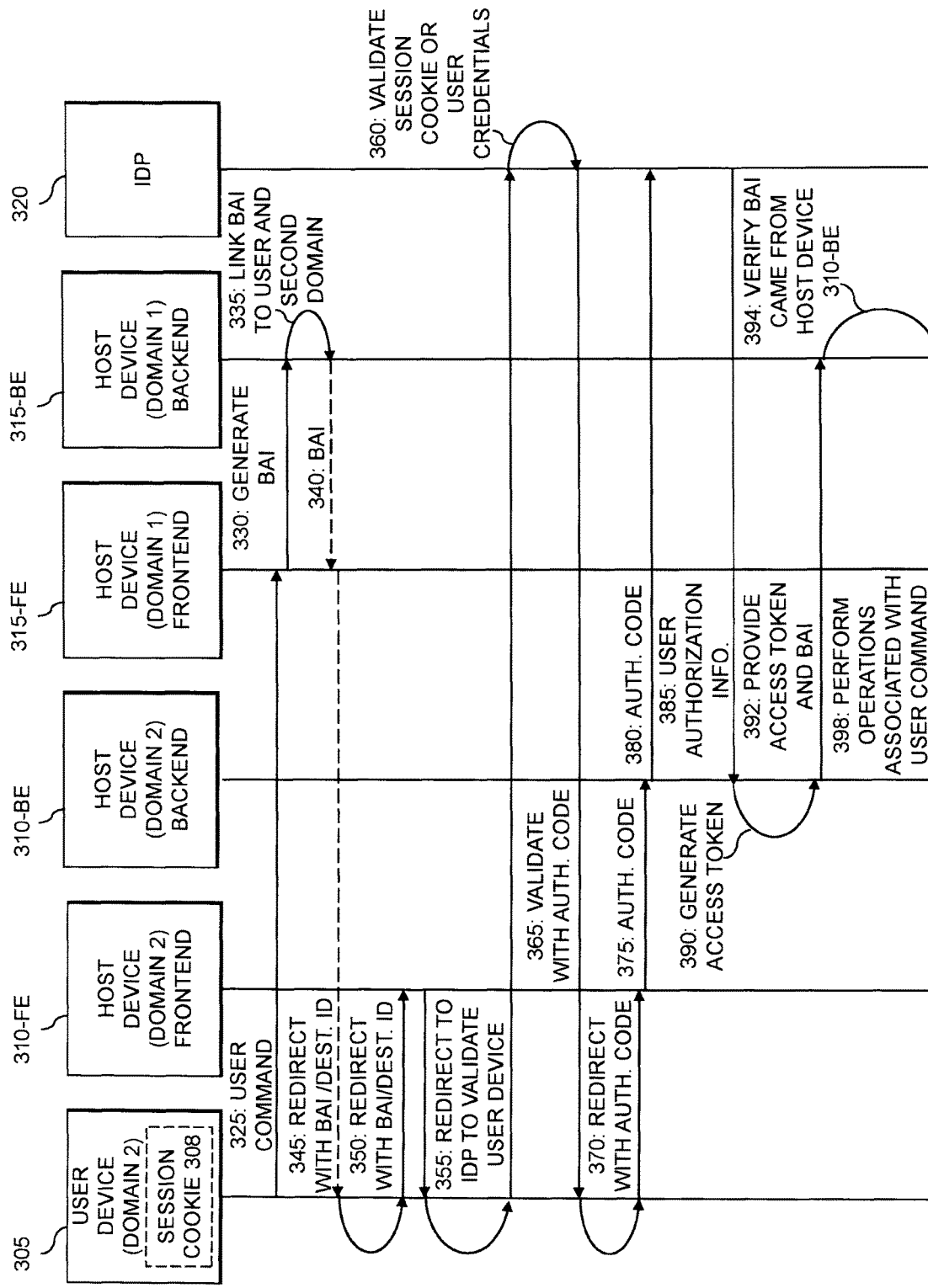
FIG. 3 is a communication diagram illustrating inter-domain access in accordance with an illustrative embodiment.

FIG. 3 is a communication diagram illustrating inter-domain access in accordance with an illustrative embodiment. In the example of FIG. 3, a user device 305 associated with a second domain (domain 2) provides a user command 325 to a frontend host device 315-FE associated with a first domain (domain 1). The user command may require a backend host device 315-BE associated with the first domain to perform one or more operations on a backend host device 310-BE associated with the second domain using an access token of the second domain to access the backend host device 310-BE.

In step 330, the frontend host device 315-FE associated with the frontend of the first domain generates a backend access identifier (BAI) for the transaction. In step 335, the frontend host device 315-FE associated with the frontend of the first domain links the BAI with the user device 305 and the backend host device 310-BE associated with the second domain. The BAI is sent to the frontend host device 315-FE associated with the first domain in step 340. As used herein, the term "access identifier" shall be broadly construed to encompass any identifier that is linked to a particular transaction and/or session, such as a device access identifier or a backend access identifier, as would be apparent to a person of ordinary skill in the art.

In steps 345 and 350, the frontend host device 315-FE associated with the first domain spawns a new browser session (e.g., via redirection) on the frontend host device 310-FE associated with the second domain with the BAI and a destination identifier as URL parameters. The redirection of steps 345 and 350 may be a transparent session since user interaction is not needed. The browser of the user device 305 opens on a web graphical user interface (GUI) login page of the frontend host device 310-FE associated with the second domain and an authorization code login sequence will be initiated in steps 355 through 385, whereby an access token is generated by the backend host device 310-BE associated with the second domain.

In step 355, the frontend host device 310-FE associated with the second domain is redirected to an IDP 320 to validate the user device 305. The IDP validates an existing session cookie of the user device 305 or user credentials associated with the user device 305 in step 360. For example, if the user device 305 has previously authenticated to the IDP 320, the IDP 320 recognizes the existing user session cookie, automatically authenticates (e.g., validates) the user, and redirects the user device 305 back to the frontend host device 310-FE associated with the second domain with an authorization code in the URL in steps 365 and 370. The frontend host device 310-FE associated with the second domain sends the authorization code to the backend host device 310-BE associated with the second domain in step 375.

The backend host device 310-BE associated with the second domain sends the authorization code in step 380 to the IDP 320. The IDP 320 provides the backend host device 310-BE associated with the second domain with an IDP assertion (e.g., for SAML/OIDC) comprising user authorization information in step 385.

The backend host device 310-BE associated with the second domain generates an access token in step 390. The access token may remain in the backend host device 310-BE associated with the second domain in some embodiments, and the browser session cookie of the second domain is updated (e.g., to a logged in state). As used herein, the term "access token" shall be broadly construed to encompass any objecting embodying and/or representing security credentials of a user for a session, such as a session cookie, as would be apparent to a person of ordinary skill in the art. In some embodiments, an access token identifies a given user and privileges of the user.

In step 392, the backend host device 310-BE associated with the second domain provides the generated access token and the BAI to the backend host device 315-BE associated with the first domain (e.g., using a secure connection to the backend host device 315-BE, based on the destination identifier of the first domain and a designated trust mechanism). The backend host device 315-BE verifies the BAI in step 394 and that the BAI came from the backend host device 310-BE associated with the second domain.

The backend host device 315-BE associated with the first domain calls an API endpoint in step 398 on the backend host device 310-BE associated with the second domain that is used to provide one or more access tokens and the BAI. The 315-BE can then perform one or more operations on the backend host device 310-BE associated with the second domain on behalf of the user device 305.

FIG. 4 is a sample table 400 illustrating a storage of access tokens by one or more of the host devices associated with a first domain of FIG. 2 in accordance with an illustrative embodiment. In the example of FIG. 4, the sample table 400 is associated with a backend host device of a first domain to store access tokens generated and provided by backend host devices associated with a second domain (such as acme.com and jokesoftheday.com). The sample table 400 may be stored, for example, in one or more access token repositories (e.g., one or more access token repositories 155 of FIG. 1) or in a remote database. As indicated above, the backend host devices associated with a second domain generate and store access tokens to be used in connection with operations performed by a backend host device associated with a first domain on behalf of a user device. For each access token, the sample table 400 maintains an identifier of the user, an identifier of the second domain and the respective access token.

FIGS. 5A and 5B, collectively, are a process diagram 500-1, 500-2 illustrating an exemplary implementation of a process for inter-domain access using an IDP in accordance with an illustrative embodiment. In the example of FIG. 5A, it is assumed that a user device and a second domain share a common IDP using SSO techniques (although different SSO protocols may be employed by different entities). In addition, trust is established between the two domains, such as, by using a mutual authentication protocol (e.g., mTLS) or shared credentials so that the backend host device (e.g., 315-BE) associated with the first domain can call the backend host device (e.g., 310-BE) associated with the second domain in a secure manner. Further, in at least some embodiments, the two domains provide REST (Representational State Transfer) endpoints and support the redirection operations implemented as part of the process.

In step 0 of FIG. 5A, a user logs into a first site connected to an IDP (e.g., an SSO IDP) and obtains a session cookie (e.g., an IDP session cookie) from the IDP. Thus, further attempts by the user to login to sites federating the same IDP will succeed, without having to enter user credentials. The user initiates a command on a first site in step 1 that will need a backend of the first site to perform one or more operations on a backend of a second site using an access token provided by the backend of the second site. The backend of the first site generates a BAI for the transaction in step 2 and sends the BAI to a frontend (e.g., the web GUI) of the first site. As noted above, the BAI in some embodiments is associated with a specific user, and the specific second site to which backend access is required.

The frontend of the first site spawns a new browser session in step 3 on a login page of the second site, passing the BAI and the destination identifier of the first site as URL parameters. The session may be a transparent session since user interaction is not needed.

The browser of the user device opens a login page of the second site in step 4, with the BAI as part of the URL, initiating an authorization code login sequence in steps 4A through 4F, whereby an access token is provided to the backend of the first site. In step 4A, the frontend of the second site is redirected to the IDP. The SSO IDP recognizes the existing session cookie of the user device (from step 0) in step 4B, authenticates the user device, and redirects back to the frontend of the second site adding the authorization code to the URL.

In step 4C, the frontend of the second site reloads with the authorization code and sends the authorization code to the backend of the second site. The backend of the second site then sends the authorization code to the IDP in step 4D and obtains an IDP assertion of the user device (thus, the user is now authenticated). In step 4E, the backend of the second site issues the user access tokens to the backend of the second site. The second site access tokens remain in the second site backend in step 4F, and the browser session cookie of the second site is updated (e.g., to a logged in status).

As shown in FIG. 5B, the second site backend opens a secure connection in step 5 to the first site backend, based on the destination identifier of the first site, using a designated trust mechanism (e.g., defined as a prerequisite); and calls an API endpoint, on the first site, that is used to provide the one or more access tokens and the BAI, so that the first site can associate the access tokens and the BAI with the user and session. In step 6, the first site backend receives the access token and the BAI, matches the BAI with the user, verifies that the BAI came from the second site backend, and then caches the access token. In step 7, the first site backend performs one or more operations on the second site backend using the access token.

In some embodiments, a connection between the backends of the first and second sites can be initiated by the second site, as described above, or by the first site polling the second site. In addition, a connection between the backends of the first and second sites may rely on direct or indirect connections (e.g., if such connections can be secured). The BAI and the resulting credentials may be transferred using URL parameters, POST parameters, as part of a request header, or in another way to pass the parameters to REST calls, as would be apparent to a person of ordinary skill in the art.

Figure 6:
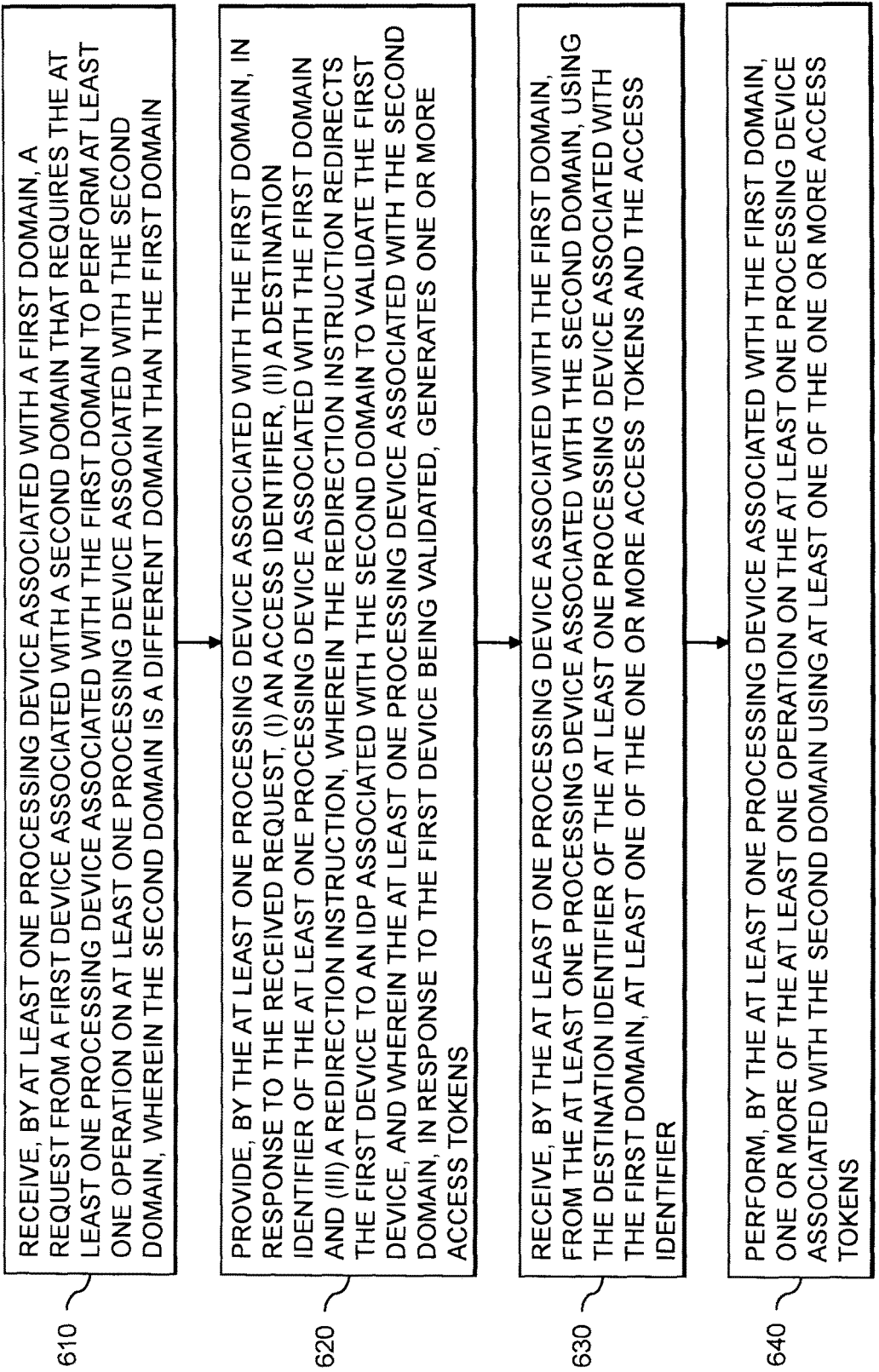
FIG. 6 is a flow diagram illustrating an exemplary implementation of a process for inter-domain access in accordance with an illustrative embodiment.

FIG. 6 is a flow chart illustrating an exemplary implementation of a process 600 for inter-domain access using an IDP in accordance with an illustrative embodiment. In the example of FIG. 6, the process 600 receives, in step 610, by at least one processing device associated with a first domain, a request from a first device associated with a second domain that requires the at least one processing device associated with the first domain to perform at least one operation on at least one processing device associated with the second domain, wherein the second domain is a different domain than the first domain.

In step 620, the at least one processing device associated with the first domain provides, in response to the received request, (i) an access identifier, (ii) a destination identifier of the at least one processing device associated with the first domain and (iii) a redirection instruction. The redirection instruction redirects the first device to an IDP associated with the second domain to validate the first device, and wherein the at least one processing device associated with the second domain, in response to the first device being validated, generates one or more access tokens.

The at least one processing device associated with the first domain receives, in step 630, from the at least one processing device associated with the second domain, using the destination identifier of the at least one processing device associated with the first domain, at least one of the one or more access tokens and the access identifier.

The at least one processing device associated with the first domain performs one or more of the at least one operation on the at least one processing device associated with the second domain in step 640 using at least one of the one or more access tokens.

In some embodiments, the access identifier is linked to the first device and the at least one processing device associated with the second domain. The access identifier, the destination identifier of the at least one processing device associated with the first domain and the redirection instruction may be provided to the first device as uniform resource locator parameters.

In one or more embodiments, the first device has a session cookie issued by the IDP associated with the at least one processing device associated with the second domain. The IDP may validate the first device by one or more of validating the session cookie and providing a session cookie responsive to the IDP authenticating the first device.

In at least one embodiment, the access identifier identifies a scope of the at least one operation to be performed by the at least one processing device associated with the first domain on the at least one processing device associated with the second domain. The receiving, by the at least one processing device associated with the first domain, the at least one of the one or more access tokens and the access identifier may further comprise the at least one processing device associated with the first domain verifying the access identifier.

In some embodiments, the at least one processing device associated with the first domain comprises a backend of the first domain, wherein the at least one processing device associated with the second domain comprises a backend of the second domain and wherein the backend of the first domain performs the at least one operation on the backend of the second domain. The redirection instruction redirects the first device to the at least one processing device associated with the second domain, and wherein the second domain redirects the first device to the IDP associated with the second domain to validate the first device, wherein the redirection instruction comprises (i) the access identifier and (ii) the destination identifier of the at least one processing device associated with the first domain.

The particular processing operations and other network functionality described in conjunction with FIGS. 2, 3, 5A, 5B and 6, for example, are presented by way of illustrative example only, and should not be construed as limiting the scope of the disclosure in any way. Alternative embodiments can use other types of processing operations for inter-domain access using an IDP. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for inter-domain access using an IDP can be employed, for example, to allow a first device, in a first domain, to initiate a new browser session on a second device, in a second domain, that will generate a user access token provided to a backend associated with the second device, and securely transfer the user access token to the backend associated with the first device. The user access token can be used, for example, to call APIs provided by the second device on behalf of the user. In this manner, the first device is provided with an offline access token to the second device, without the user providing his or her credentials, and without involving a common IDP in the authorization flow of either domain.

One or more embodiments of the disclosure provide improved methods, apparatus and computer program products for inter-domain access using an IDP. The foregoing applications and associated embodiments should be considered as illustrative only, and numerous other embodiments can be configured using the techniques disclosed herein, in a wide variety of different applications.

It should also be understood that the disclosed inter-domain access techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for inter-domain access using an IDP may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based inter-domain access engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based inter-domain access platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
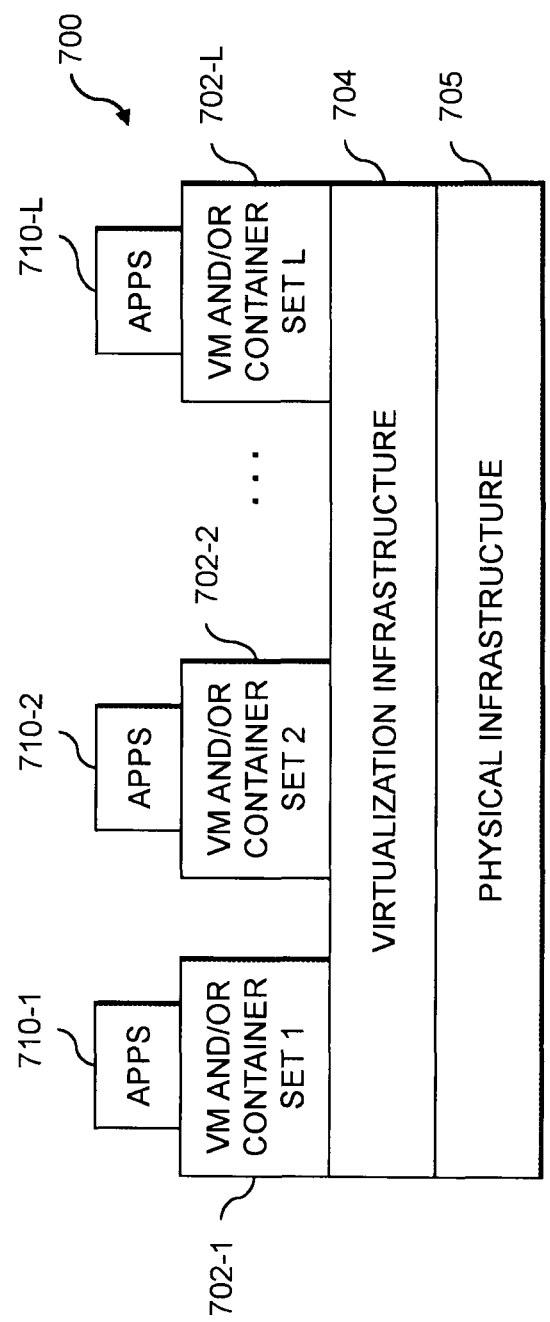
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide inter-domain access functionality of the type described above for one or more processes running on a given one of the VMs. For example, each of the VMs can implement inter-domain access control logic and associated operation processing functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide inter-domain access functionality of the type described above for one or more processes running on different ones of the containers. For example, a container host device supporting multiple containers of one or more container sets can implement one or more instances of inter-domain access control logic and associated operation processing functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
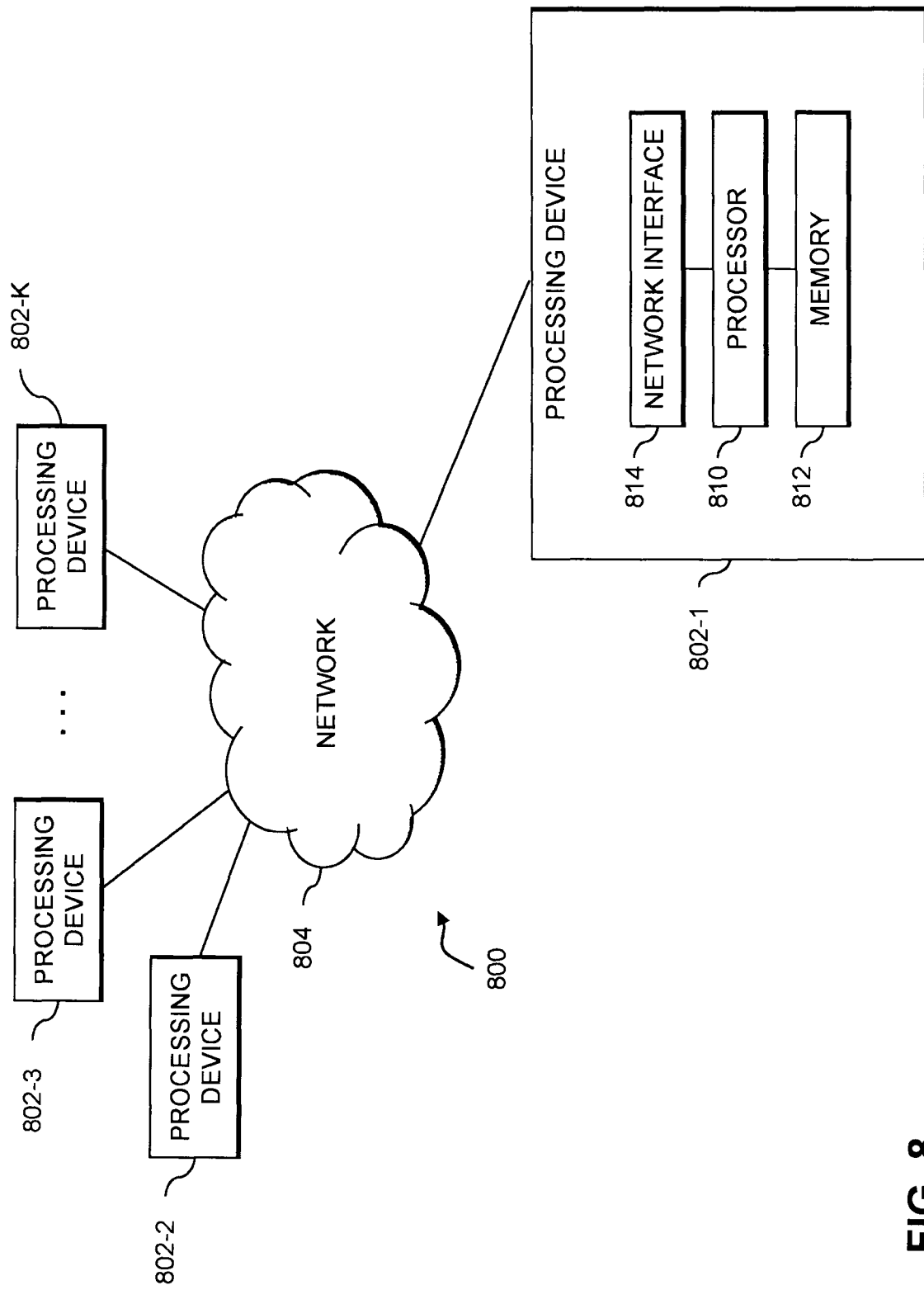
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    receiving, by at least one processing device associated with a first domain, a request from a first device associated with a second domain that requires the at least one processing device associated with the first domain to perform at least one operation on at least one processing device associated with the second domain, wherein the second domain is a different domain than the first domain;
    providing, by the at least one processing device associated with the first domain, in response to the received request, (i) an access identifier, (ii) a destination identifier of the at least one processing device associated with the first domain and (iii) a redirection instruction, wherein the redirection instruction redirects the first device to an identity provider associated with the second domain to validate the first device, and wherein the at least one processing device associated with the second domain, in response to the first device being validated, generates one or more access tokens;
    receiving, by the at least one processing device associated with the first domain, from the at least one processing device associated with the second domain, using the destination identifier of the at least one processing device associated with the first domain, at least one of the one or more access tokens and the access identifier; and
    performing, by the at least one processing device associated with the first domain, one or more of the at least one operation on the at least one processing device associated with the second domain using at least one of the one or more access tokens;
    wherein the method is performed by the at least one processing device, wherein the at least one processing device comprises a processor coupled to a memory.

2. The method of claim 1, wherein the access identifier is linked to the first device and the at least one processing device associated with the second domain.

3. The method of claim 1, wherein one or more of (i) the access identifier, (ii) the destination identifier of the at least one processing device associated with the first domain and (iii) the redirection instruction are provided to the first device as uniform resource locator parameters.

4. The method of claim 1, wherein the first device has a session cookie issued by the identity provider associated with the at least one processing device associated with the second domain.

5. The method of claim 4, wherein the identity provider validates the first device by one or more of validating the session cookie and providing a session cookie responsive to the identity provider authenticating the first device.

6. The method of claim 1, wherein the access identifier identifies a scope of the at least one operation to be performed by the at least one processing device associated with the first domain on the at least one processing device associated with the second domain.

7. The method of claim 1, wherein the receiving, by the at least one processing device associated with the first domain, the at least one of the one or more access tokens and the access identifier further comprises the at least one processing device associated with the first domain verifying the access identifier.

8. The method of claim 1, wherein the at least one processing device associated with the first domain comprises a backend of the first domain, wherein the at least one processing device associated with the second domain comprises a backend of the second domain and wherein the backend of the first domain performs the at least one operation on the backend of the second domain.

9. The method of claim 1, wherein the redirection instruction redirects the first device to the at least one processing device associated with the second domain, and wherein the second domain redirects the first device to the identity provider associated with the second domain to validate the first device, wherein the redirection instruction comprises (i) the access identifier and (ii) the destination identifier of the at least one processing device associated with the first domain.

10. An apparatus comprising:
  at least one processing device comprising a processor coupled to a memory, wherein the at least one processing device is associated with a first domain;
  the at least one processing device being configured to implement the following steps:
  receiving, by the at least one processing device associated with the first domain, a request from a first device associated with a second domain that requires the at least one processing device associated with the first domain to perform at least one operation on at least one processing device associated with the second domain, wherein the second domain is a different domain than the first domain;
  providing, by the at least one processing device associated with the first domain, in response to the received request, (i) an access identifier, (ii) a destination identifier of the at least one processing device associated with the first domain and (iii) a redirection instruction, wherein the redirection instruction redirects the first device to an identity provider associated with the second domain to validate the first device, and wherein the at least one processing device associated with the second domain, in response to the first device being validated, generates one or more access tokens;
  receiving, by the at least one processing device associated with the first domain, from the at least one processing device associated with the second domain, using the destination identifier of the at least one processing device associated with the first domain, at least one of the one or more access tokens and the access identifier; and
  performing, by the at least one processing device associated with the first domain, one or more of the at least one operation on the at least one processing device associated with the second domain using at least one of the one or more access tokens.

11. The apparatus of claim 10, wherein one or more of (i) the access identifier, (ii) the destination identifier of the at least one processing device associated with the first domain and (iii) the redirection instruction are provided to the first device as uniform resource locator parameters.

12. The apparatus of claim 10, wherein the identity provider validates the first device by one or more of validating a session cookie of the first device and providing a session cookie responsive to the identity provider authenticating the first device.

13. The apparatus of claim 10, wherein the access identifier identifies a scope of the at least one operation to be performed by the at least one processing device associated with the first domain on the at least one processing device associated with the second domain.

14. The apparatus of claim 10, wherein the receiving, by the at least one processing device associated with the first domain, the at least one of the one or more access tokens and the access identifier further comprises the at least one processing device associated with the first domain verifying the access identifier.

15. The apparatus of claim 10, wherein the at least one processing device associated with the first domain comprises a backend of the first domain, wherein the at least one processing device associated with the second domain comprises a backend of the second domain and wherein the backend of the first domain performs the at least one operation on the backend of the second domain.

16. A non-transitory processor-readable storage medium having stored therein program code of one or more software programs, wherein the program code when executed by at least one processing device, associated with a first domain, causes the at least one processing device to perform the following steps:
  receiving, by the at least one processing device associated with the first domain, a request from a first device associated with a second domain that requires the at least one processing device associated with the first domain to perform at least one operation on at least one processing device associated with the second domain, wherein the second domain is a different domain than the first domain;
  providing, by the at least one processing device associated with the first domain, in response to the received request, (i) an access identifier, (ii) a destination identifier of the at least one processing device associated with the first domain and (iii) a redirection instruction, wherein the redirection instruction redirects the first device to an identity provider associated with the second domain to validate the first device, and wherein the at least one processing device associated with the second domain, in response to the first device being validated, generates one or more access tokens;
  receiving, by the at least one processing device associated with the first domain, from the at least one processing device associated with the second domain, using the destination identifier of the at least one processing device associated with the first domain, at least one of the one or more access tokens and the access identifier; and
  performing, by the at least one processing device associated with the first domain, one or more of the at least one operation on the at least one processing device associated with the second domain using at least one of the one or more access tokens.

17. The non-transitory processor-readable storage medium of claim 16, wherein one or more of (i) the access identifier, (ii) the destination identifier of the at least one processing device associated with the first domain and (iii) the redirection instruction are provided to the first device as uniform resource locator parameters.

18. The non-transitory processor-readable storage medium of claim 16, wherein the identity provider validates the first device by one or more of validating a session cookie of the first device and providing a session cookie responsive to the identity provider authenticating the first device.

19. The non-transitory processor-readable storage medium of claim 16, wherein the access identifier identifies a scope of the at least one operation to be performed by the at least one processing device associated with the first domain on the at least one processing device associated with the second domain.

20. The non-transitory processor-readable storage medium of claim 16, wherein the at least one processing device associated with the first domain comprises a backend of the first domain, wherein the at least one processing device associated with the second domain comprises a backend of the second domain and wherein the backend of the first domain performs the at least one operation on the backend of the second domain.

* * * * *